(12) United States Patent
Burt et al.

(10) Patent No.: US 6,901,950 B1
(45) Date of Patent: Jun. 7, 2005

(54) FIRE HYDRANT LOCKING DEVICE

(76) Inventors: James E. Burt, 6262 Red Cedar Cir., Green Acres, FL (US) 33463; Fredrick D. Ireland, 1551 NW. 3rd St., Boynton, FL (US) 33463

( * ) Notice: Subject to any disclaimer, the term of this patent is extended or adjusted under 35 U.S.C. 154(b) by 0 days.

(21) Appl. No.: 10/863,761

(22) Filed: Jun. 8, 2004

(51) Int. Cl.[7] ............................................. F16K 35/06
(52) U.S. Cl. ..................... 137/382; 137/294; 220/284; 220/725; 220/726; 220/727
(58) Field of Search ...................... 70/175, 179, 183, 70/186; 137/296, 382, 385, 800; 220/284, 724, 725, 726, 727; 251/95, 111, 112

(56) References Cited

U.S. PATENT DOCUMENTS

| | | | |
|---|---|---|---|
| 359,714 A | * 3/1887 | Deming | ........................ 70/176 |
| 3,450,148 A | * 6/1969 | Mongelluzo et al. | ........ 137/296 |
| 3,453,897 A | 7/1969 | Adinolfi | |
| 3,560,130 A | * 2/1971 | Horhota | ....................... 137/385 |
| 4,280,525 A | * 7/1981 | Byrnes | ......................... 137/296 |
| 4,284,099 A | * 8/1981 | Rifat | ........................... 137/296 |
| 4,614,203 A | * 9/1986 | Russo | ......................... 137/385 |
| 4,620,428 A | 11/1986 | Kopesky | |
| 4,936,336 A | * 6/1990 | McCauley et al. | ........... 137/296 |
| 5,046,523 A | * 9/1991 | Horhota | ....................... 137/385 |
| 5,205,312 A | 4/1993 | Jerman et al. | |
| 5,549,133 A | * 8/1996 | Sigelakis | ...................... 137/296 |
| 5,630,442 A | * 5/1997 | Julicher | ....................... 137/296 |
| 5,722,450 A | * 3/1998 | Julicher | ....................... 137/296 |
| 5,727,590 A | * 3/1998 | Julicher et al. | .............. 137/296 |
| 6,112,761 A | * 9/2000 | Scotto | ......................... 137/296 |

* cited by examiner

Primary Examiner—Kevin Lee

(57) ABSTRACT

Fire hydrant locking devices prevent fire hydrants from being turned on without a key. A fire hydrant has a keyhole in its sidewall. A security bolt is threadedly inserted into the keyhole with one end frictionally engaging with the valve stem in the interior of the fire hydrant in one embodiment. In an alternative embodiment, the security bolt pushes a locking pin through a locking pin hole in the valve stem. The security bolt has key projections that are accessed through the keyhole by a key wrench. The key wrench has key slots that mate with the key projections. The key wrench has a handle for applying torque to the security bolt. The fire hydrant has hose connection ports connected to its sidewall that are removably covered by covers.

11 Claims, 4 Drawing Sheets

FIRE HYDRANT LOCKING DEVICE

BACKGROUND OF THE INVENTION

1. Field of the Invention

The present invention relates to a fire hydrant locking device for use in connection with fire hydrants. The fire hydrant locking device has particular utility in connection with preventing fire hydrants from being turned on without a key.

2. Description of the Prior Art

Fire hydrant locking devices are desirable for preventing fire hydrants from being turned on without a key. A major problem, especially in urban areas, is the unauthorized opening of fire hydrants. The valve stem head on a traditional fire hydrant is easily manipulated with common tools. In the summer months, particularly during periods of high temperatures, children will turn on fire hydrants to play in the water. The water is generally permitted to spray into the street and runoff. When too many fire hydrants are opened in a particular area, the water pressure can be adversely affected to the point that it is insufficient for putting out fires. Furthermore, water wasted in this fashion can exacerbate drought conditions. Fire hydrant locking devices prevent these difficulties by allowing fire hydrants to be locked and only utilizable by persons having an appropriate key.

The use of tamperproof constructions for hydrant actuating nuts is known in the prior art. For example, U.S. Pat. No. 4,936,336 to McCauley et al. discloses a tamperproof construction for hydrant actuating nut. However, the McCauley et al. '336 patent does not leave the hydrant actuating nut uncovered, and has further drawbacks of lacking a keyhole in the side of the fire hydrant.

U.S. Pat. No. 3,453,897 to Adinolfi discloses a hydrant locking device that prevents tampering with fire hydrants. However, the Adinolfi '897 patent does not engage directly with the middle of the valve stem of the fire hydrant, and additionally does not have a keyhole in the side of the fire hydrant.

Similarly, U.S. Pat. No. 5,727,590 to Julicher et al. discloses a tamper resistant construction for hydrant actuating nut that prevents unauthorized actuation of the hydrant nut of a fire hydrant. However, the Julicher et al. '590 patent does not leave the hydrant actuating nut uncovered, and does not have a keyhole in the side of the fire hydrant.

In addition, U.S. Pat. No. 5,630,442 to Julicher discloses a tamper resistant construction for hydrant actuating nut that prevents unauthorized actuation of the hydrant nut of a fire hydrant. However, the Julicher '442 patent does not leave the hydrant actuating nut uncovered, and also does not have a keyhole in the side of the fire hydrant.

Furthermore, U.S. Pat. No. 5,205,312 to Jerman et al. discloses a fire hydrant locking arrangement that inhibits the unauthorized opening of fire hydrants. However, the Jerman et al. '312 patent does not leave the hydrant actuating nut uncovered, and further lacks a keyhole in the side of the fire hydrant.

Lastly, U.S. Pat. No. 4,620,428 to Kopesky discloses a lock and coupling for securing fire hydrants that prevents unauthorized opening of fire hydrants. However, the Kopesky '428 patent does not leave the hydrant actuating nut uncovered, and has the additional deficiency of lacking a keyhole in the side of the fire hydrant.

While the above-described devices fulfill their respective, particular objectives and requirements, the aforementioned patents do not describe a fire hydrant locking device that allows preventing fire hydrants from being turned on without a key. The above patents make no provision for a keyhole in the side of the fire hydrant. With the exception of the Adinolfi '897 patent, the above patents do not leave the hydrant actuating nut uncovered. The Adinolfi '897 patent does not engage directly with the middle of the valve stem of the fire hydrant.

Therefore, a need exists for a new and improved fire hydrant locking device that can be used for preventing fire hydrants from being turned on without a key. In this regard, the present invention substantially fulfills this need. In this respect, the fire hydrant locking device according to the present invention substantially departs from the conventional concepts and designs of the prior art, and in doing so provides an apparatus primarily developed for the purpose of preventing fire hydrants from being turned on without a key.

SUMMARY OF THE INVENTION

In view of the foregoing disadvantages inherent in the known types of tamperproof constructions for hydrant actuating nuts now present in the prior art, the present invention provides an improved fire hydrant locking device, and overcomes the above-mentioned disadvantages and drawbacks of the prior art. As such, the general purpose of the present invention, which will be described subsequently in greater detail, is to provide a new and improved fire hydrant locking device which has all the advantages of the prior art mentioned heretofore and many novel features that result in a fire hydrant locking device which is not anticipated, rendered obvious, suggested, or even implied by the prior art, either alone or in any combination thereof.

To attain this, the present invention essentially comprises a fire hydrant with one end of a hose connection port attached to its sidewall. The fire hydrant encloses a valve stem, which has a valve stem head attached to one end that protrudes from the fire hydrant's top. A security bolt has one end threadedly inserted into a keyhole present in the fire hydrant's sidewall. The security bolt has a key projection attached to one end. A key wrench is removably inserted into the keyhole. A key slot is present in the key wrench.

There has thus been outlined, rather broadly, the more important features of the invention in order that the detailed description thereof that follows may be better understood and in order that the present contribution to the art may be better appreciated.

The invention may also include at least a portion of the valve stem adjacent to the keyhole being square in cross-section. The valve stem head may be pentagonal. The key slot may be adapted to receive the key projection. There may be a cover removably covering the opposing end of the hose connection port. There may be a handle attached to the key wrench. The key projection may comprise a cylinder with one end attached to the end of the security bolt and a plurality of rectangular prisms with one side attached to the end of the security bolt. The rectangular prisms may have one end pointed towards the cylinder and their opposing ends 120° apart from one another. The security bolt may be selected from the group consisting of plastic, steel, aluminum, titanium, and carbon fiber composite. The valve stem may have a locking pin hole in its middle. There may be a locking pin with one end attached to the security bolt's opposing end with its opposing end removably inserted through the locking pin hole. The invention may be an improvement to a fire hydrant. There are, of course, additional features of the invention that will be described hereinafter and which will form the subject matter of the claims attached.

Numerous objects, features, and advantages of the present invention will be readily apparent to those of ordinary skill in the art upon a reading of the following detailed description of presently current, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved fire hydrant locking device that has all of the advantages of the prior art tamperproof constructions for hydrant actuating nuts and none of the disadvantages.

It is another object of the present invention to provide a new and improved fire hydrant locking device that may be easily and efficiently manufactured and marketed.

An even further object of the present invention is to provide a new and improved fire hydrant locking device that has a low cost of manufacture with regard to both materials and labor, and which accordingly is then susceptible of low prices of sale to the consuming public, thereby making such fire hydrant locking device economically available to the buying public.

Still another object of the present invention is to provide a new fire hydrant locking device that provides in the apparatuses and methods of the prior art some of the advantages thereof, while simultaneously overcoming some of the disadvantages normally associated therewith.

Even still another object of the present invention is to provide a fire hydrant locking device for preventing fire hydrants from being turned on without a key. This allows a fire hydrant to be locked in an open position.

Still yet another object of the present invention is to provide a fire hydrant locking device for preventing fire hydrants from being turned on without a key. This makes it possible to lock a fire hydrant in a closed position.

An additional object of the present invention is to provide a fire hydrant locking device for preventing fire hydrants from being turned on without a key. This prevents water from being wasted by the unauthorized opening of a fire hydrant.

A further object of the present invention is to provide a fire hydrant locking device for preventing fire hydrants from being turned on without a key. This allows authorized persons to open a fire hydrant.

Lastly, it is an object of the present invention to provide a new and improved fire hydrant locking device for preventing fire hydrants from being turned on without a key.

These together with other objects of the invention, along with the various features of novelty that characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there is illustrated current embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE CURRENT EMBODIMENT

Figures 1, 2:
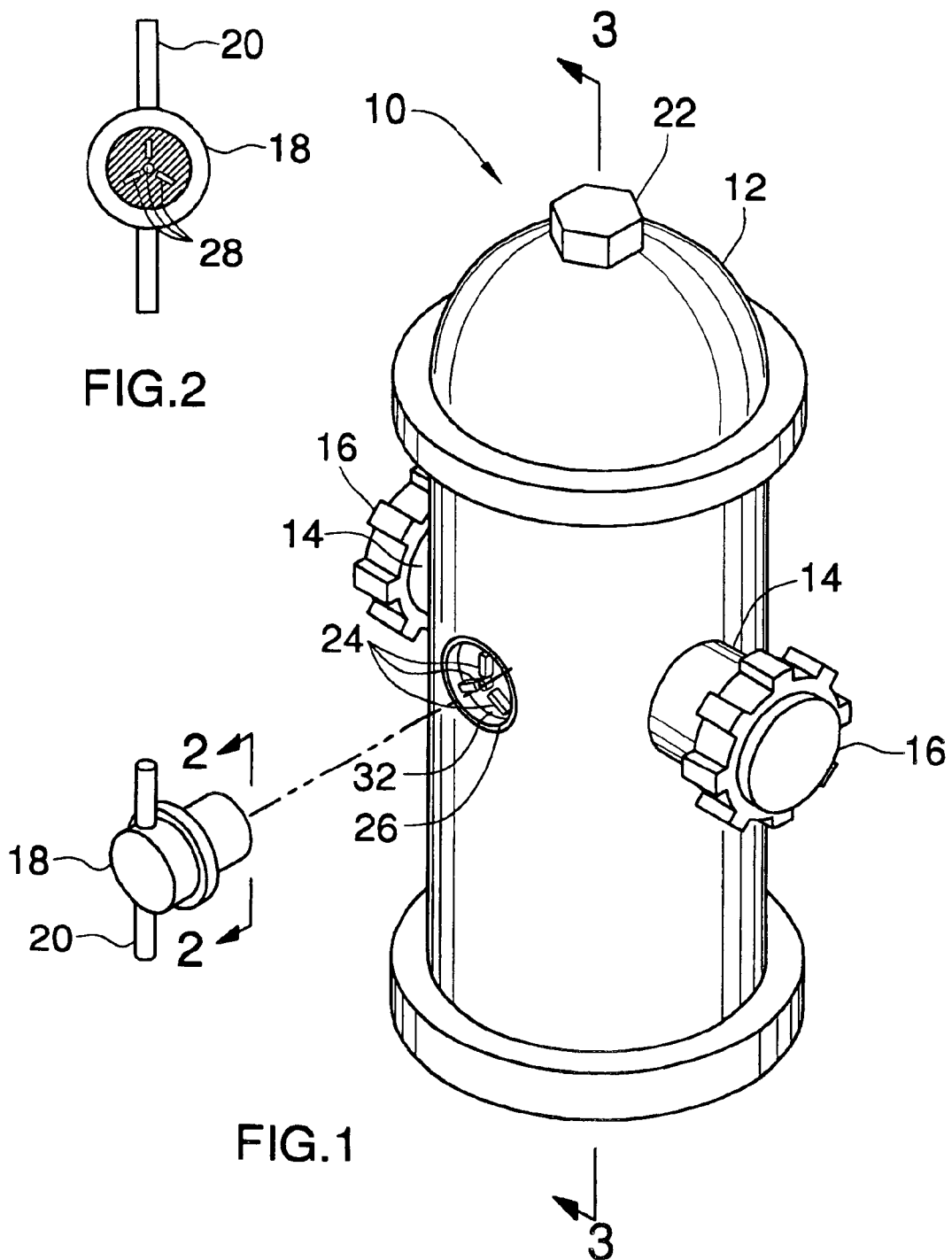
FIG. 1 is a top perspective exploded view of the current embodiment of the fire hydrant locking device constructed in accordance with the principles of the present invention.
FIG. 2 is a bottom side view of the key wrench of the present invention.

Referring now to the drawings, and particularly to FIGS. 1–5, a current embodiment of the fire hydrant locking device of the present invention is shown and generally designated by the reference numeral 10.

In FIG. 1, a new and improved fire hydrant locking device 10 of the present invention for preventing fire hydrants from being turned on without a key is illustrated and will be described. More particularly, the fire hydrant locking device 10 has a fire hydrant 12 with a valve stem head 22 protruding from its top and two hose connection ports 14 connected to its sidewall. Each of the hose connection ports 14 one is covered by a removable cover 16. The cover 16 prevents dirt and debris from collecting within the hose connection ports 14 and fire hydrant 12. Also present in the sidewall of the fire hydrant 12 is a keyhole 26. To lock the fire hydrant 12, a security bolt 32 is threadedly inserted into the keyhole 26. The security bolt 32 has key projections 24 protruding from it. A key wrench 18 has key slots 28 (not visible) that mate with the key projections 24. As a result, a user (not shown) can apply torque to the security bolt 32 by turning the handle 20 of key wrench 18. This allows the user to insert and remove the security bolt 32 as needed to lock or unlock the fire hydrant 12. When the fire hydrant 12 is locked, the key projections 24 are flush with the sidewall of the fire hydrant 12 so that they are protected from damage. In the current embodiment, the security bolt 32 is made of stainless steel and the key projections 24 are a cylinder and three rectangular prisms with the three rectangular prisms being arranged so that one end is pointed towards the cylinder and their opposing ends are 120° apart. The unique arrangement of the key projections 24 prevents commonly available tools from turning the security bolt 32.

Moving on to FIG. 2, a new and improved key wrench 18 of the present invention for preventing fire hydrants from being turned on without a key is illustrated and will be described. More particularly, the key wrench 18 has key slots 28 which are adapted to fit the key projections 24 (not shown) attached to one end of the security bolt 32 (not shown). A handle 20 allows the user to apply torque to the security bolt 32 (not shown) once the key projections 24 have been inserted into the key slots 28.

Figure 3:
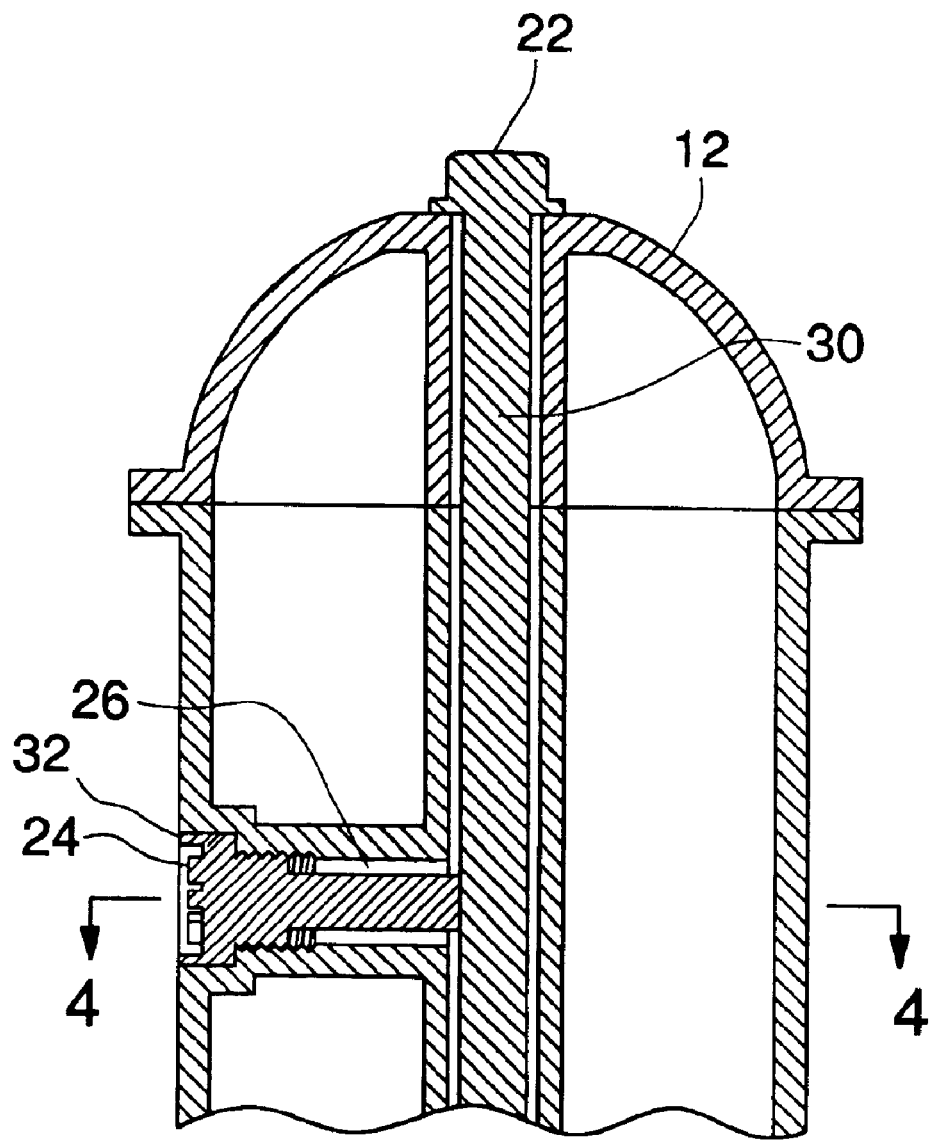
FIG. 3 is a side sectional view of the security bolt of the present invention.

Continuing with FIG. 3, a new and improved security bolt 32 of the present invention for preventing fire hydrants from being turned on without a key is illustrated and will be described. More particularly, the security bolt 32 has key projections 24 attached to one end. The security bolt 32 is threadedly inserted into the keyhole 26 present in the sidewall of the fire hydrant 12. When the fire hydrant 12 is locked, the security bolt 32 has its opposing end frictionally engaged with the valve stem 30. As a result, even if valve stem head 22 has torque applied to it, the valve stem 30 cannot move, and the fire hydrant 12 remains closed. Alternatively, if the fire hydrant 12 has already been opened, then the security bolt 32 prevents the fire hydrant 12 from being closed.

Figure 4:
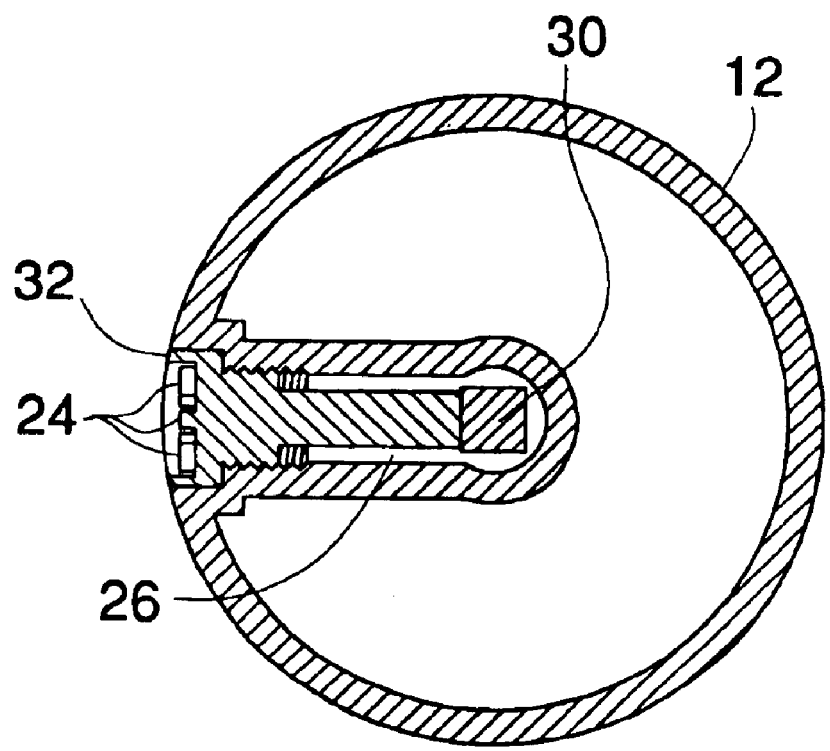
FIG. 4 is a top sectional view of the security bolt of the present invention.

In FIG. 4, a new and improved security bolt 32 of the present invention for preventing fire hydrants from being turned on without a key is illustrated and will be described. More particularly, the security bolt 32 has key projections 24 attached to one end. The security bolt 32 is threadedly inserted into the keyhole 26 present in the sidewall of the fire hydrant 12. When the fire hydrant 12 is locked, the security bolt 32 has its opposing end frictionally.engaged with the valve stem 30. As a result, even if valve stem head 22 (not shown) has torque applied to it, the valve stem 30 cannot move, and the fire hydrant 12 remains closed. Alternatively, if the fire hydrant 12 has already been opened, then the security bolt 32 prevents the fire hydrant 12 from being closed. In the current embodiment, the valve stem 30 is square in cross-section.

Figure 5:
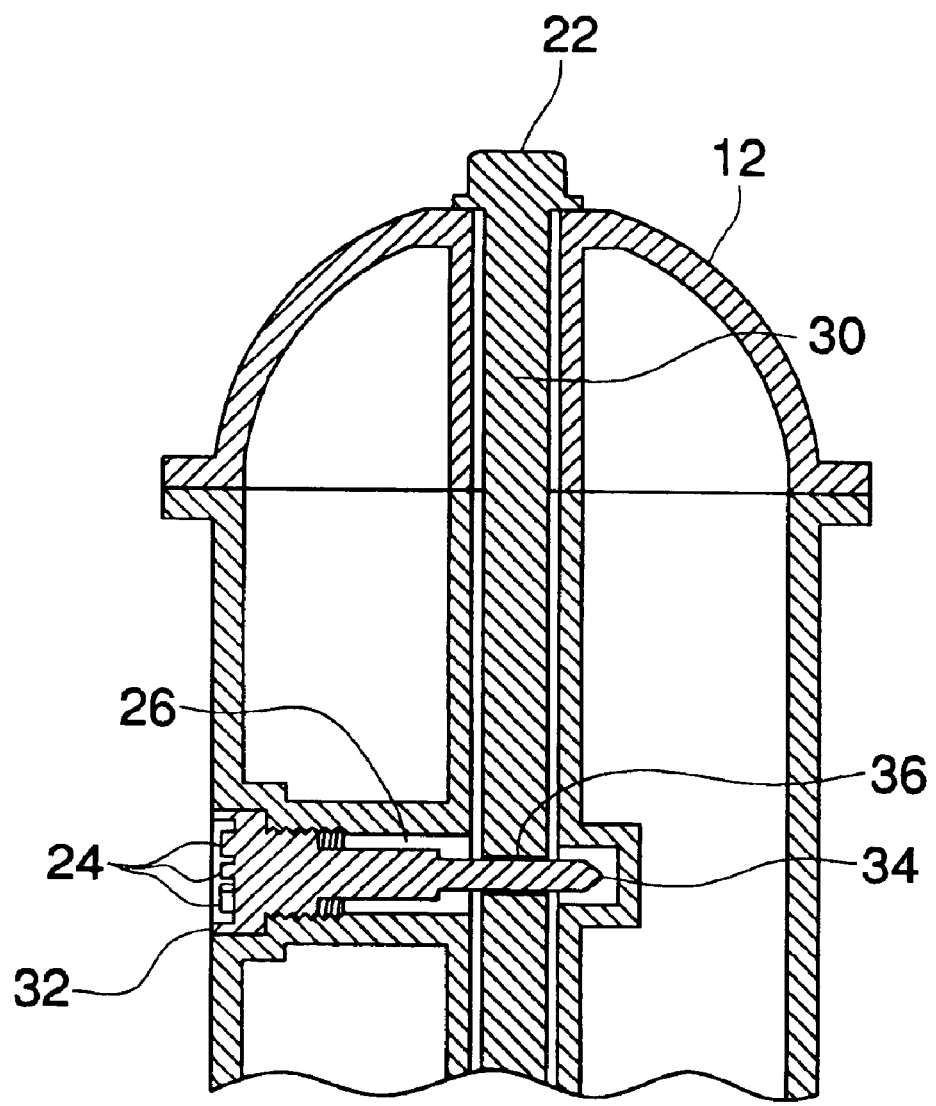
FIG. 5 is a side sectional view an alternative embodiment of the security bolt of the present invention.

Concluding with FIG. 5, an alternative embodiment of the new and improved security bolt 32 of the present invention for preventing fire hydrants from being turned on without a key is illustrated and will be described. More particularly, the alternative embodiment of the security bolt 32 has key projections 24 attached to one end. The security bolt 32 is threadedly inserted into the keyhole 26 present in the sidewall of the fire hydrant 12. When the fire hydrant 12 is locked, the security bolt 32 pushes the locking pin 34 through the locking pin hole 36 in the valve stem 30. As a result, even if valve stem head 22 has torque applied to it, the valve stem 30 cannot move, and the fire hydrant 12 remains closed. Alternatively, if the fire hydrant 12 has already been opened, then the security bolt 32 prevents the fire hydrant 12 from being closed.

In use, it can now be understood that when an authorized person needs to open a fire hydrant 12, he or she fits the key projections 24 into the key slots 28 of the key wrench 18 and applies torque to the security bolt 32 via handle 20 to withdraw the security bolt 32 from the keyhole 26 so that valve stem 30 can turn freely. At that point, the user removes one or both of the covers 16 and attaches one or more fire hoses to the hose connection ports 14. The user then applies torque to the valve stem head 22 to open the fire hydrant 12. The user can optionally lock the fire hydrant 12 in an open position by using the key wrench 18 to replace the security bolt 32 within the keyhole 26. Once the user turns the fire hydrant 12 off, the user uses the key wrench 18 to replace the security bolt 32 within the keyhole 26 to prevent unauthorized opening of the fire hydrant 12.

While a current embodiment of the fire hydrant locking device has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as plastic, aluminum, titanium, and carbon fiber composite may be used instead of the stainless steel security bolt described. Also, the key projections may also be made in a wide range of shapes. And although preventing fire hydrants from being turned on without a key has been described, it should be appreciated that the fire hydrant locking device herein described is also suitable for locking a number of objects. Furthermore, a wide variety of valve stem head shapes may be used instead of the pentagonal shape described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A fire hydrant locking device comprising:
    a fire hydrant having a top, a sidewall, and an interior;
    a hose connection port having opposing ends with one end attached to said sidewall of said fire hydrant;
    a valve stem having opposing ends, a middle, and a sidewall, wherein said fire hydrant encloses said valve stem;
    a valve stem head attached to one end of said valve stem and protruding from said top of said fire hydrant;
    a keyhole, wherein said sidewall of said fire hydrant defines a hole therein to comprise said keyhole;
    a security bolt having opposing ends with one end threadedly inserted into said keyhole and said opposing end frictionally engaged with said sidewall of said valve stem to prevent said valve stem from rotating;
    a key projection having opposing ends with one end attached to said end of said security bolt;
    a key wrench, wherein said key wrench is removably inserted into said keyhole; and
    a key slot, wherein said key wrench defines a slot therein to comprise said key slot.

2. The fire hydrant locking device as defined in claim 1, wherein at least a portion of said valve stem adjacent to said keyhole is square in cross-section.

3. The fire hydrant locking device as defined in claim 1, wherein said valve stem head is pentagonal.

4. The fire hydrant locking device as defined in claim 1, wherein said key slot is adapted to receive said key projection.

5. The fire hydrant locking device as defined in claim 1, further comprising a cover removably covering said opposing end of said hose connection port.

6. The fire hydrant locking device as defined in claim 1, further comprising a handle attached to said key wrench.

7. The fire hydrant locking device as defined in claim 1, wherein said key projection comprises:
    a cylinder having opposing ends with one end attached to said end of said security bolt; and a plurality of rectangular prisms having opposing sides and opposing ends with one side attached to said end of said security bolt.

8. The fire hydrant locking device as defined in claim 7, wherein said rectangular prisms have one end pointed towards said cylinder and said opposing ends are 120° apart from one another.

9. The fire hydrant locking device as defined in claim 1, wherein said security bolt is selected from the group consisting of plastic, steel, aluminum, titanium and carbon fiber composite.

10. In combination with a fire hydrant, including a sidewall and a valve stem having an outer surface, the improvement which comprises:

a keyhole, wherein said sidewall of said fire hydrant defines a hole therein to comprise said keyhole;

a security bolt having opposing ends with one end threadedly inserted into said keyhole and said opposing end frictionally engaged with said outer surface of said valve stem to prevent said valve stem from rotating;

a plurality of key projections having opposing ends with one end attached to said end of said security bolt;

a key wrench, wherein said key wrench is removably inserted into said keyhole; and a plurality of key slots, wherein said key wrench defines slots therein to comprise said key slots and said key slots are adapted to fit said key projections.

11. The improvement to a fire hydrant as defined in claim 10, wherein said key projections comprise:

a cylinder having opposing ends with one end attached to said end of said security bolt; and a plurality of rectangular prisms having opposing sides and opposing ends with one side attached to said end of said security bolt, wherein said rectangular prisms have one end pointed towards said cylinder and said opposing ends are 120° apart from one another.

\* \* \* \* \*